Dec. 6, 1966      E. E. FOWLER      3,289,392
COLLECTOR CELL HOUSING FOR ELECTROSTATIC PRECIPITATOR
Original Filed Aug. 29, 1963
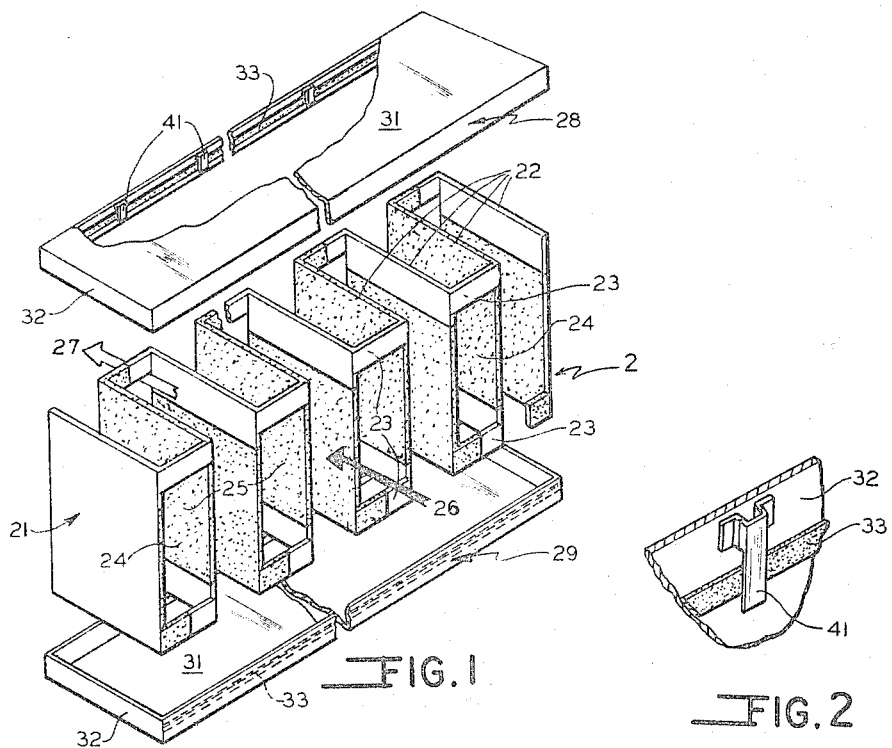
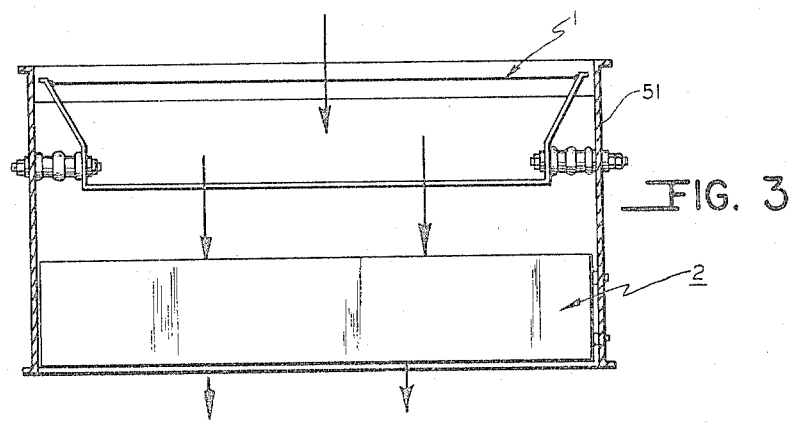
INVENTOR.
EVANS E. FOWLER
BY
*Ralph O. Brick*
ATTORNEY

United States Patent Office 3,289,392
Patented Dec. 6, 1966

3,289,392
COLLECTOR CELL HOUSING FOR ELECTROSTATIC PRECIPITATOR
Evans E. Fowler, Louisville, Ky., assignor to American Air Filter Company, Inc., Louisville, Ky., a corporation of Delaware
Original application Aug. 29, 1963, Ser. No. 305,280. Divided and this application Dec. 21, 1965, Ser. No. 539,590
2 Claims. (Cl. 55—142)

The present application is a division of application Serial No. 305,280 filed August 29, 1963.

The present invention relates to gas filters of the electrostatic precipitator type and more particularly to a disposable type collector cell for an electrostatic precipitator.

It long has been known in the art of gas cleaning to clean a gas stream by first passing it through an ionizing chamber whereby foreign particles therein are given electrostatic charges and then passing such stream through a collector chamber including a collector cell containing electrically charged plates to which the charged particles are attracted and to which they adhere. In order to avoid the many problems associated with the cleaning of such plates after precipitating operations, various attempts have been made to provide collector cells of a disposable type. For the most part, past disposable type collector cell arrangements have been complex and expensive in construction and have not been completely self-contained, quite often depending upon additional and elaborate permanent type installations in order to constitute an operative precipitating unit.

The present invention provides an inexpensive and straightforward disposable collector cell arrangement for an electrostatic precipitator which can be readily constructed with a minimum of parts and with a minimum of operational steps to provide a stable and efficient self-contained collector cell unit. In addition the collector cell arrangement of the present invention can be readily and efficiently assembled and disassembled as a unit cell in the electrostatic precipitator housing, requiring a minimum of additional parts for support and efficient precipitating operations.

Various other features of the present invention will become obvious to one skilled in the art upon reading the disclosure set forth herein.

More particularly, the present invention provides a collector cell for an electrostatic precipitator comprising: a continuous sheet of dielectric material folded to provide a plurality of spaced parallel side-by-side walls having intermediate wall connecting portions therebetween; each of the parallel walls being substantially coated on the face portions thereof with electrically conductive material with adjacent walls being electrically insulated from each other; passage means to permit flow of a gas stream to be treated through the cell parallel the coated walls; and, means to charge and ground side-by-side coated walls in alternate fashion to provide a potential gradient between adjacent walls.

It is to be understood that various changes can be made in the arrangement, form and construction of the apparatus disclosed herein without departing from the scope or spirit of the present invention.

Referring to the drawing:

FIGURE 1 is an exploded isometric view of an embodiment of the present invention;

FIGURE 2 is an enlarged isometric view of a portion of the structure of FIGURE 1; and, FIGURE 3 is a cross-sectional schematic plan view of an electrostatic precipitator incorporating a self-contained cell structure similar to that disclosed in FIGURE 1.

Referring to FIGURES 1 and 2 of the drawing, an arrangement of the present invention is disclosed. This arrangement includes a continuous strip of dielectric material 21 which can be formed from a readily disposable and inexpensive material, such as chipboard or cardboard, or a suitable plastic material. Strip 21 can be scored and folded in serpentine form to provide spaced, parallel side-by-side walls 22, the end walls of which serve as outer walls of the frame structure. Walls 22 are connected by intermediate wall connecting portions 23, each of which is provided with an aperture or passageway 24 therein which permits passage of a gas stream to be treated therethrough, the gas stream flowing from upstream dirty gas inlet side 26 to downstream clean gas outlet side 27. In this connection, it is to be understood that the present intion is not to be considered as restricted to the gas flow directions indicated. If desired, the direction of gas flow can be reversed in either embodiment of the invention disclosed.

To hold side-by-side walls 22 of strip 21 in properly folded, parallel position, upper and lower rectangular shaped box-like end members 28 and 29 respectively are provided. These box-like members are sized to engage with the opposite edges of the folded strip 21 and thus form a flow-through type frame structure. The box-like members 28 and 29, which can be interchangeable, are so arranged that each includes a flat rectangular panel portion 31 and an integral border member 32 extending normally therefrom.

In order that the frame structure of FIGURES 1 and 2 might function as a collector cell for an electrostatic precipitator, side-by-side walls 22 and the intermediate wall connecting portions 23 are substantially coated along the face portions thereof with an electrically conductive material 25. This material can be applied in such a manner so that the opposite coated faces of each side-by-side wall 22 between the end walls and a part of an adjacent intermediate connecting portion 23 are electrically connected to each other and so that adjacent side-by-side walls 22 are electrically insulated from each other by the uncoated portion of the dielectric material of the strip. Thus, interleaved sets of side-by-side walls are provided. It is to be noted that the electrically conductive coating also is applied to the inner face of the outer walls of the frame and a part of the connecting portions adjacent thereto in such a manner that the inner faces are insulated from the inner side walls immediately adjacent thereto.

To charge and ground the interleaved side-by-side wall sets in alternate fashion so as to provide a potential gradient between adjacent walls, an electrically conductive stripe 33 is provided along the inner face of each of the border members 32 of the box-like members 28 and 29, each conductive stripe 33 being arranged to electrically connect one of the two sets of interleaved walls by contacting the intermediate wall connecting portions 23. Stripes 33 are electrically connected to suitable terminal portions (not shown), with one being electrically connected to a suitable electric power pack and the other to ground (not shown). In such a manner, it is then possible to place an electric potential gradient between adjacent walls of the cells. It is to be noted that the electrically conductive coating applied to the walls of the cell of FIGURE 1 can be comprised of thin sheets of electrically conductive aluminum foil fastened to the dielectric strip by some suitable means such as glue or staples. Or, advantageously, the coating can be comprised of electrically conductive paint applied in the manner of a printed circuit to the dielectric strip and box-like members prior to their set-up in cell form. It is to be further noted that the border member 32 of each box-like member 28 and 29 can be povided along its inner face with a plurality of spaced clips 41 fastened thereto. These clips insure that the box-like members 28 and 29 firmly engage with the edges of the folded strip 21 to provide a stable and secure collector cell structure and to further insure proper electrical contact between the conductive stripes 33 and the coating on the intermediate connecting portions 23 of strip 21.

As can be seen in FIGURE 3, once a collector cell 2 has been properly set-up, it is a simple matter to insert the cell into a flow-through precipitator housing 51, which housing includes in the upstream portion thereof an ionizer section 1. Although not disclosed in detail, it will be obvious to those skilled in the art that the ionizer section 1 and collector cell section 2 can be connected to any one of a number of types of suitable electrical power packs, known in the art.

The invention claimed is:

1. A collector cell housing for an electrostatic precipitator comprising: a continuous sheet of dielectric material folded to provide a bank of spaced, parallel, side-by-side walls having intermediate wall connecting portions therebetween with said extreme side-by-side walls of said bank forming cell housing end walls; said intermediate connecting portions extending transverse a gas stream to be treated and having apertures therein to permit passage therethrough of a gas stream to be treated; said side-by-side walls extending parallel to the gas stream to be treated as it passes through said cell housing; the inner faces of said cell housing end walls, each of said other parallel, side-by-side walls, and a part of said intermediate connecting portions being substantially coated on the face portions thereof with electrically conductive material with adjacent walls being electrically insulated from each other; a pair of spaced, box-like members positioned along opposite edges of said folded sheet of dielectric material to support said sheet in folded form, said box-like members including a conductive stripe thereon to connect alternate coated intermediate portions which in turn are connected to alternate side-by-side walls so as to provide first and second interleaved sets of coated, side-by-side walls, one of which is connected to ground and the other to an electric charge.

2. The apparatus of claim 1 and clip means to insure fast contact between the electrically conductive stripe means on the box members and the coating on the intermediate wall portions and firm support of the box members with the edges of the continuous folded sheet of material.

References Cited by the Examiner
UNITED STATES PATENTS

| | | | |
|---|---|---|---|
| 1,992,974 | 3/1935 | Thompson | 55—155 X |
| 2,535,697 | 12/1950 | Ross | 55—154 X |
| 2,565,458 | 8/1951 | Weisz | 55—142 |
| 2,579,440 | 12/1951 | Palmer | 55—142 |
| 2,650,672 | 9/1953 | Barr et al. | 55—154 X |
| 2,735,509 | 2/1956 | Fields | 55—154 X |
| 2,822,057 | 2/1958 | Richardson | 54—154 X |
| 2,868,319 | 1/1959 | Rivers | 55—132 |
| 2,908,348 | 10/1959 | Rivers et al. | 55—154 X |
| 3,127,258 | 3/1964 | Revell | 55—500 X |
| 3,143,403 | 8/1964 | Swensen | 55—156 |

ROBERT F. BURNETT, *Primary Examiner.*